(12) United States Patent
Bodney et al.

(10) Patent No.: US 12,520,847 B2
(45) Date of Patent: Jan. 13, 2026

(54) BAKING MAT

(71) Applicant: Helen of Troy Limited, St. Michael (BB)

(72) Inventors: Anna Claire Bodney, Brooklyn, NY (US); Vicente Valderrama, Staten Island, NY (US); Julianna Chiaramonte, Tuckahoe, NY (US); Shaun Zirges, Jersey City, NJ (US); Hayir Benat Facquet, Hoboken, NJ (US)

(73) Assignee: KAZ EUROPE SÁRL, Bussigny (CH)

( * ) Notice: Subject to any disclaimer, the term of this patent is extended or adjusted under 35 U.S.C. 154(b) by 147 days.

(21) Appl. No.: 18/110,448

(22) Filed: Feb. 16, 2023

(65) Prior Publication Data
US 2024/0276989 A1 Aug. 22, 2024

(51) Int. Cl.
*A21B 3/13* (2006.01)
(52) U.S. Cl.
CPC .................................. *A21B 3/131* (2013.01)
(58) Field of Classification Search
CPC ........ A21B 3/131; A21B 3/138; A47J 47/005; G01B 3/02
USPC .......................................... 220/573.1; 33/494
See application file for complete search history.

(56) References Cited

U.S. PATENT DOCUMENTS

| | | | | |
|---|---|---|---|---|
| 5,386,654 A | * | 2/1995 | Kroenke | B26D 7/20 223/69 |
| 5,461,795 A | * | 10/1995 | Kok | B29C 45/16 33/483 |
| 7,043,850 B2 | * | 5/2006 | Brady | G01B 3/004 33/534 |
| D697,772 S | * | 1/2014 | Joseph | D7/699 |

(Continued)

FOREIGN PATENT DOCUMENTS

DE 202022100679 2/2022

OTHER PUBLICATIONS

My Perfect Cookie—Cookie Dough Log Shaper and Storage System; https://www.amazon.com/MY-PERFECT-COOKIE-Cookie-Storage/dp/B08CZ3BWWT; publicly available prior to Feb. 16, 2023. [Retrieved from the Internet Feb. 16, 2023].

(Continued)

*Primary Examiner* — Don M Anderson
*Assistant Examiner* — Elizabeth J Volz
(74) *Attorney, Agent, or Firm* — RANKIN, HILL & CLARK LLP (57) ABSTRACT

An apparatus for locating slice locations on a rolled food product includes a flexible mat having first and second sides extending between first and second ends, and a first surface and a second surface opposite to the first surface. The mat has an open condition where the mat is substantially flat, and the mat is configured to be rolled up about a rolling axis toward a rolled condition with the first surface facing toward the rolling axis. A plurality of marking ridges extends from (Continued)

the first surface. Each marking ridge extends with a longest dimension perpendicular to the rolling axis and spaced from an adjacent marking ridge in a direction parallel to the rolling axis. The plurality of marking ridges is configured to form indentations on an outer surface of an associated rolled food product when the mat is pressed against the associated rolled food product or vice versa.

19 Claims, 7 Drawing Sheets

(56) References Cited

U.S. PATENT DOCUMENTS

| | | | |
|---|---|---|---|
| 11,534,025 B2 | 12/2022 | Zehlka | |
| 2020/0315399 A1* | 10/2020 | Zehlka | A47J 43/20 |

OTHER PUBLICATIONS

Chicago Metallic Cookie Dough Shaper and Biscuit Cutter with 6 Recipes in Gift Box, Plastic; https://us.amazon.com/Chicago-Metallic-CMDOUGHCUTSQ-Biscuit-Recipes/dp/B07SQ93XHV; publicly available prior to Feb. 16, 2023. [Retrieved from the Internet Feb. 16, 2023].

Silicone Baking Mat, 26"×16" Extra Thick Large Non Stick Sheet Mat with Measurement Non-slip Dough Rolling Mat, Reusable Food Grade Silicone Counter Mat for Making Cookies, Macarons, Bread and Pastry; https://www.amazon.com/Silicone-Measurement-Non-slip-Reusable-Macarons/dp/B0999594RR; publicly available prior to Feb. 16, 2023. [Retrieved from the Internet Feb. 16, 2023].

Large Silicone Pastry Mat Extra Thick Non Stick Baking Mat with Measurement Fondant Mat, Counter Mat, Dough Rolling Mat, Oven Liner, Pie Crust Mat (L-16"(W)24"(L), Red); https://www.amazon.com/Silicone-Measurement-Fondant-Counter-Rolling/dp/B07MK2P53L; publicly available prior to Feb. 16, 2023. [Retrieved from the Internet Feb. 16, 2023].

* cited by examiner

BAKING MAT

BACKGROUND

Cookie dough for, for example for baking of sugar cookies, is typically placed in an elongated container and then stored in a refrigerator or freezer. The container is an elongated plastic storage tube, with plastic end caps to close off the open ends of the tube. The storage tube can be provided with markings that imprint a cutting guide onto an outer surface of the cookie dough. Once chilled, the cookie dough is released from the container and sliced, with any extra cookie dough returned to the container to chill or freeze, and to bake another time. Because these known storage products are designed for a single purpose, there is a need for a food handling product that is simple in design and is easily and quickly convertible for multiuse purposes.

SUMMARY

According to one aspect, an apparatus for aiding in locating slice locations on a rolled food product is provided. The apparatus comprises a flexible mat including a first side and a second side each extending between a first end and a second end, and a first surface and a second surface opposite to the first surface. The flexible mat has an open condition where the flexible mat is substantially flat, and the flexible mat is configured to be rolled up about a rolling axis toward a rolled condition with the first surface facing toward the rolling axis. A plurality of marking ridges extends from the first surface. Each marking ridge among the plurality of marking ridges extends along the first surface with a longest dimension perpendicular to the rolling axis and spaced from an adjacent marking ridge among the plurality of marking ridges in a direction parallel to the rolling axis. The plurality of marking ridges is configured to form indentations on an outer surface of an associated rolled food product when the flexible mat is pressed against the associated rolled food product or vice versa, the indentations defining the slice locations.

According to another aspect, a method for aiding in locating slice locations on a rolled food product is provided. The exemplary method comprises placing a flexible mat in an open condition with a first surface facing up, the flexible mat including a plurality of marking ridges extending from the first surface, each marking ridge among the plurality of marking ridges extending along the first surface with a longest dimension perpendicular to a rolling axis for the flexible mat and spaced from an adjacent marking ridge among the plurality of marking ridges in a direction parallel to the rolling axis; positioning the rolled food product on the first surface and adjacent the plurality of marking ridges, the rolled food product extending in a longest dimension parallel to the rolling axis; and rolling the flexible mat together with the rolled food product about the rolling axis toward a rolled condition forming indentations on an outer surface of the rolled food product.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. Any term of degree used herein, such as "substantially" and "approximately", means a reasonable amount of deviation of the modified word is contemplated such that the end result is not significantly changed.

Figure 6:
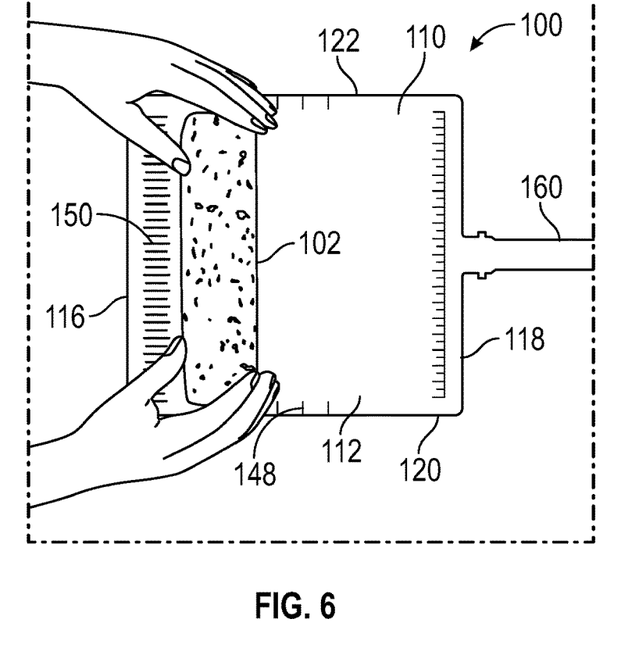
FIGS. 6, 7, 8, 9, 10 and 11 depict an exemplary method aiding in locating slice locations on a rolled food product using the apparatus of FIG. 1.

Referring now to the drawings, wherein like numerals refer to like parts throughout the several views, FIGS. 1-5 illustrate an apparatus 100 for aiding in locating slice locations on a rolled food product 102, such as the depicted cookie dough rolled into an approximately cylindrical or log shape (see FIG. 6). In the depicted aspect, the apparatus 100 comprises a mat 110 for receiving, and optionally forming, the rolled food product 102. The mat 110 is defined by a generally flat piece of material having inherently food safe, non-toxic, flexible, elastic, durable, long-lasting, tear-resistant, non-stick and easy to clean material characteristics. The material of the mat can also be heat resistant, being capable of withstanding freezing cold and intense heat. Exemplary materials having at least these inherent material characteristics include flexible silicone or silicone elastomers. In one embodiment, FDA grade silicone with no fillers can be used as the material for the mat 110.

The flexible mat 110 is unitary, being an integral one-piece body. The mat 110 includes opposed first (upper) and second (lower) surfaces 112 and 114, opposed first and second ends 116 and 118, and opposed first and second sides 120 and 122. As depicted, the first and second ends 116 and 118 are approximately parallel to one another, and the first and second sides 120 and 122 are approximately parallel to one another. The mat 110 can have a uniform thickness from the first surface 112 to the second surface 114. As shown, the first and second ends 116 and 118 are approximately equal in length, and the first and second sides 120 and 122 are approximately equal in length. The length of each of the ends 116, 118 can be smaller than the length of each of the sides 120, 122, which forms a mat 110 with a relatively thin and substantially rectangular body. However, it should be appreciated that the mat 110 can be formed of other corresponding shapes consistent with this disclosure, for example, the mat can be formed with approximately equal length ends and sides such that the mat forms an approximately square body.

Figure 10:
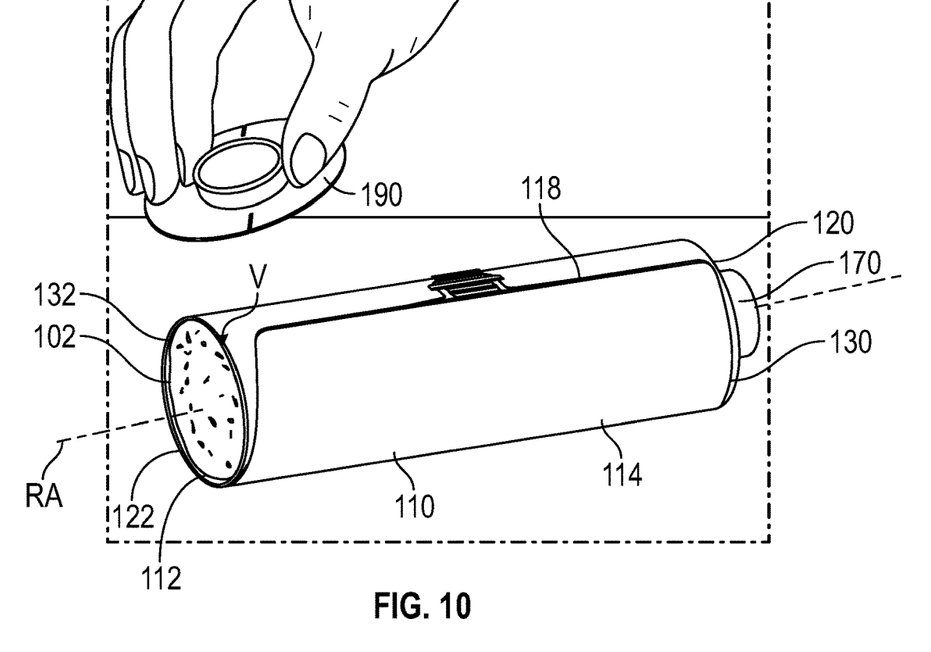

The flexible mat 110 can be easily and repeatedly moved between an open condition (see, for example, FIG. 6) where the mat is substantially flat and a rolled condition (see FIG. 10) where the mat is rolled up about a rolling axis RA depicted in FIG. 10 that is extended between the sides 120, 122, with the first surface 112 facing toward the rolling axis. It should be appreciated that position of the rolling axis RA is dependent on the size of the rolled food product 102 to be rolled in the mat 110. In the rolled condition, the first surface 112 of the mat 110 defines a volume V which is predicated on a size of the rolled food product 102 to be received therein with the first surface 112 surrounding the rolled food product. Further in the rolled condition, the second surface 114 defines an outer, exterior surface of the mat 110, and the first side 120 and the second side 122 encircle opposed first and second end openings 130, 132 to the volume.

Figure 1:
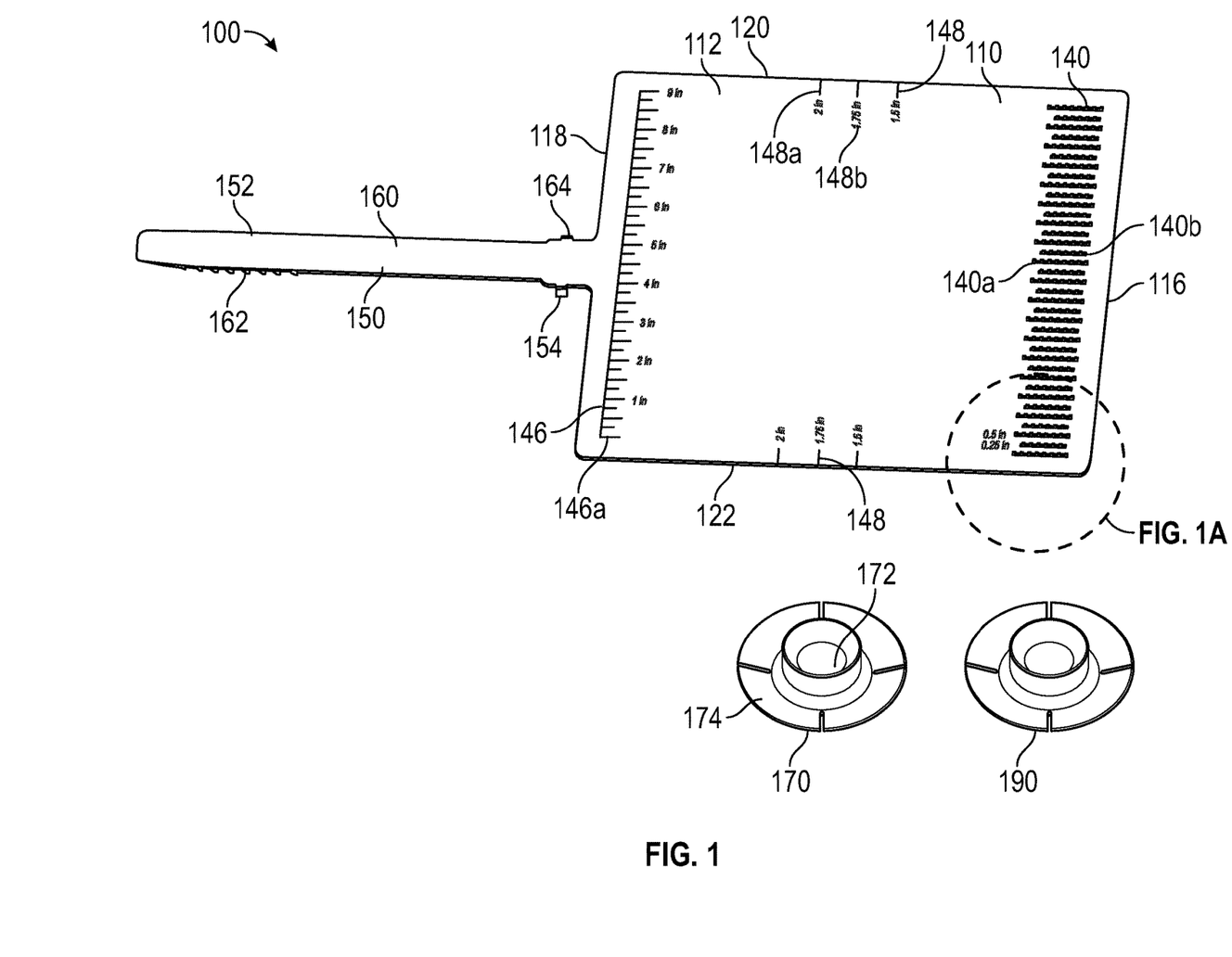
FIG. 1 is a perspective view of an apparatus for aiding in locating slice locations on a rolled food product, the apparatus including a flexible mat and first and second end caps.
Figure 1A:
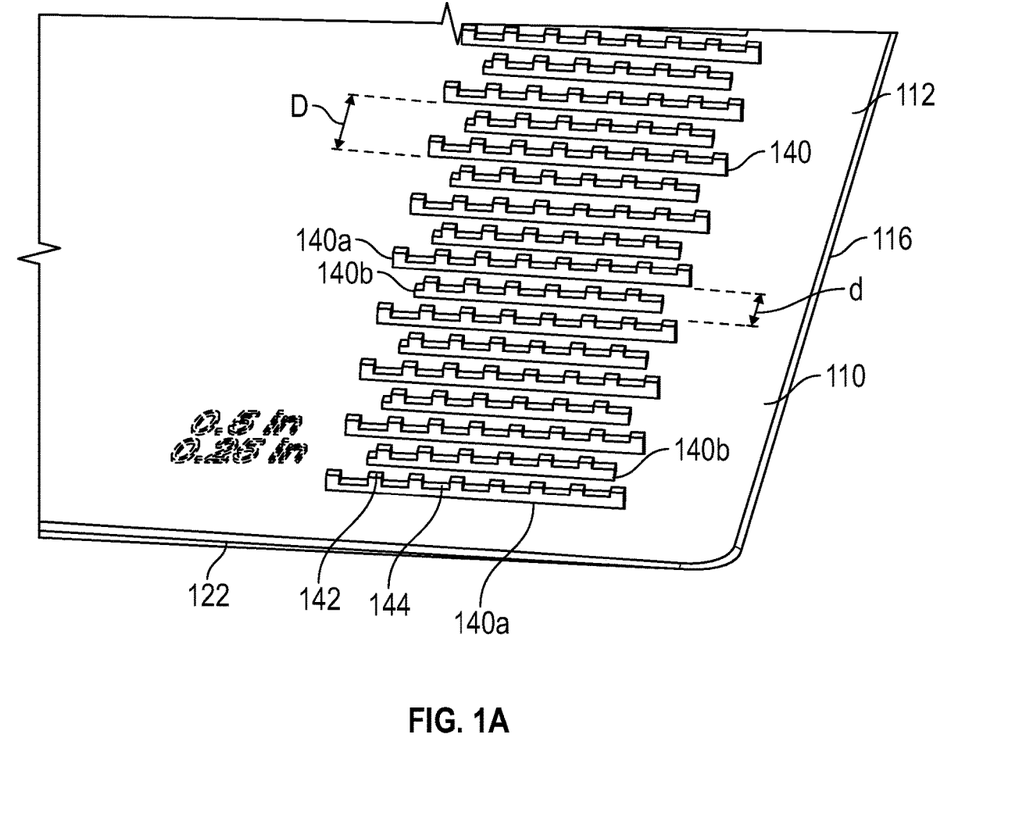
FIG. 1A is an enlarged partial view of FIG. 1.
Figure 2:
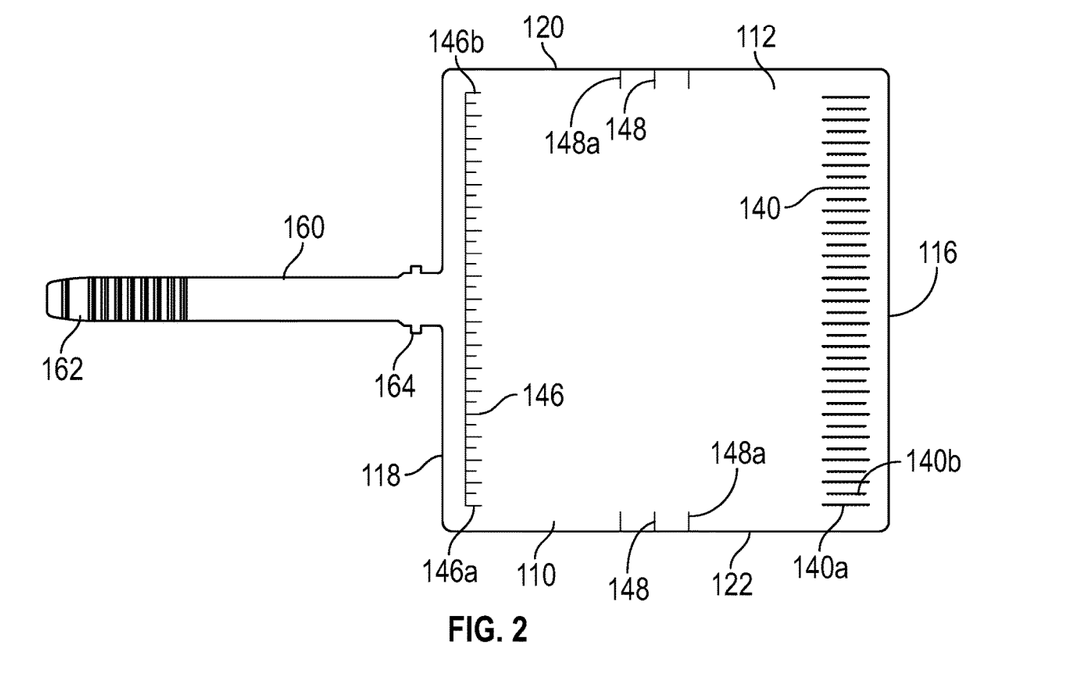
FIG. 2 is a top plan view of the flexible mat.
Figure 3:
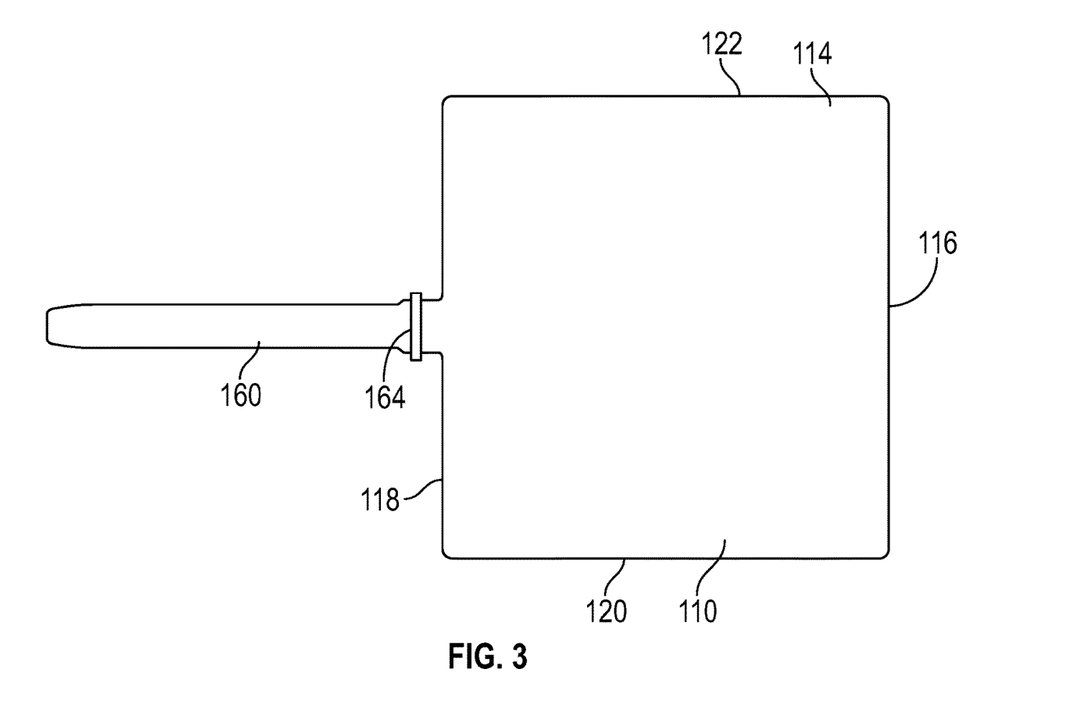
FIG. 3 is a bottom plan view of the flexible mat.
Figure 4:
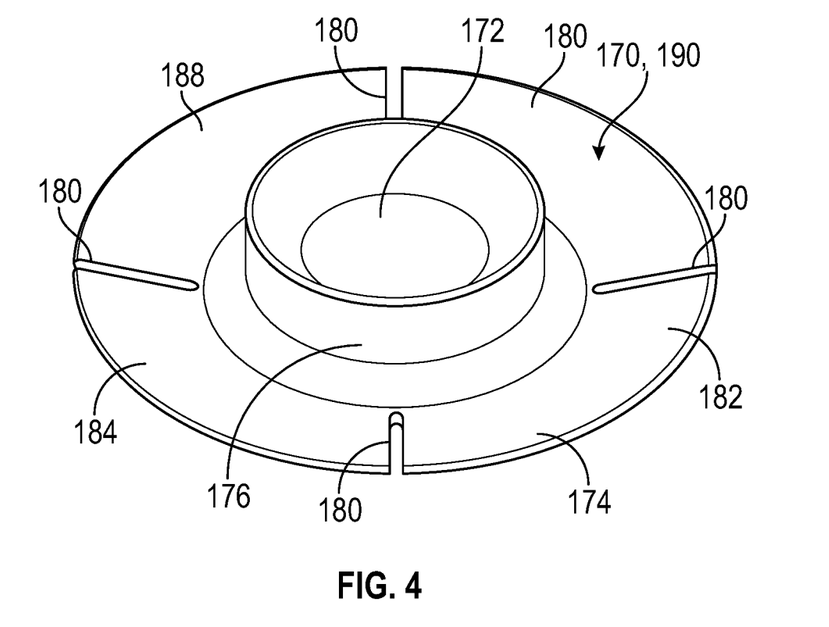
FIG. 4 is a top perspective view of one of the end caps.
Figure 5:
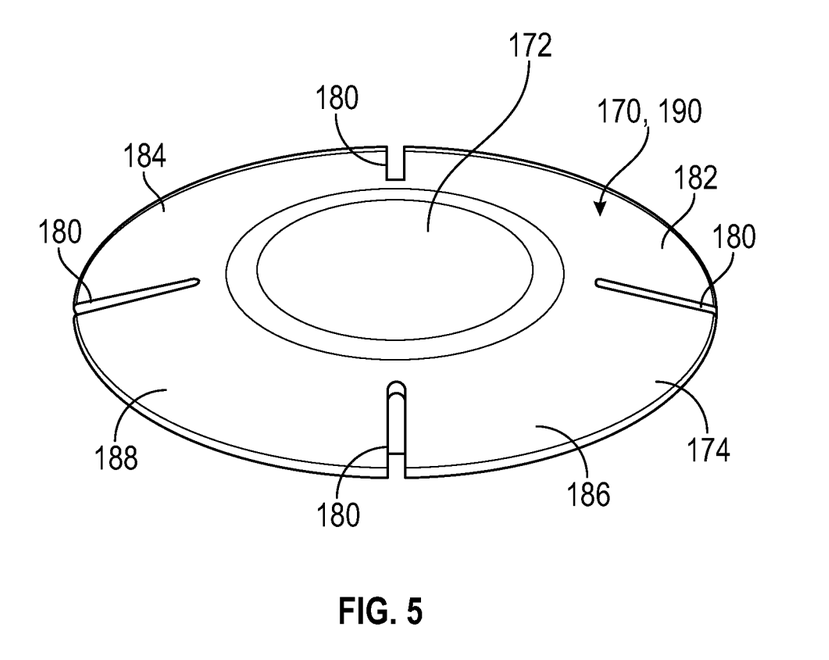
FIG. 5 is a bottom perspective view of one of the end caps.
Figure 11:
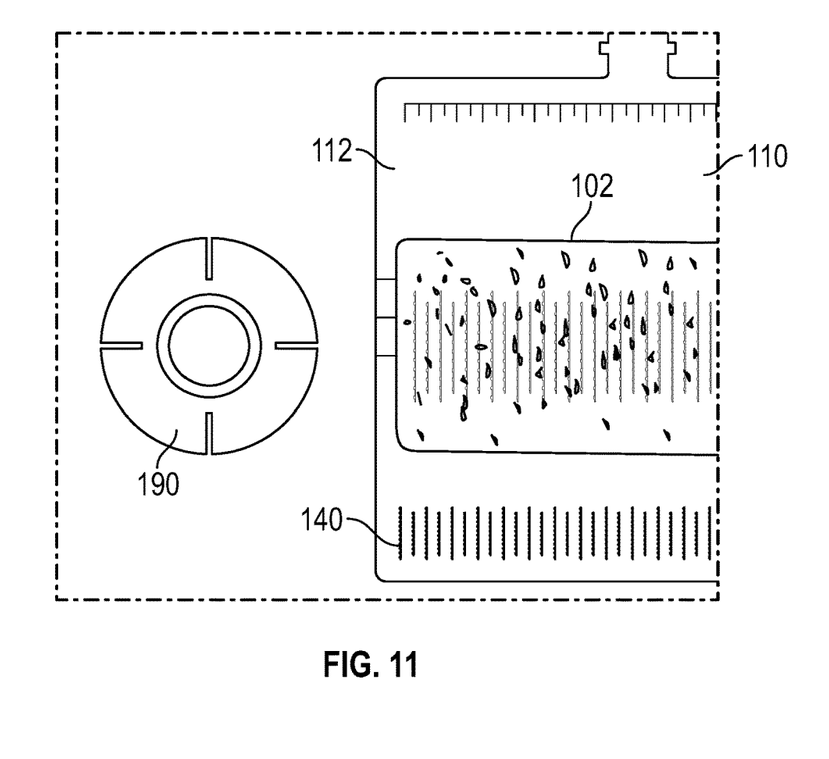

As depicted in FIGS. 1, 1A and 2, the mat 110 also includes a plurality of marking ridges 140 extending outwardly from the first surface 112, wherein each marking ridge among the plurality of marking ridges being and terminates nearer to the first end 116 as compared to the second end 118 of the mat. In the depicted aspect, each marking ridge 140 among the plurality of marking ridges extends along the first end 116 on the first surface 112 with a longest dimension perpendicular to the rolling axis RA and spaced, for example approximately equally spaced, from an adjacent marking ridge among the plurality of marking ridges in a direction parallel to the rolling axis. In the rolled condition of the mat 110 (FIG. 10), the plurality of marking ridges 140 is configured to form indentations on an outer surface of the rolled food product 102 when the flexible mat 110 is pressed against the rolled food product or vice versa. The indentations define slice locations which serve as a cutting guide on the outer surface as shown in FIG. 11.

According to the present disclosure, at least one marking ridge 140a, 140b among the plurality of marking ridges 140 can include an upper surface contoured to form the indentation without sticking to the outer surface of the rolled food product 102. In the present embodiment, the upper surface of the at least one marking ridge 140a, 140b including relatively higher offset surface portions 142 and relatively lower offset surface portions 144 that are situated closer to the first surface 112 in a direction normal to the first surface as compared to the relatively higher offset surface portions. The higher surface portions 142 and the lower surface portions 144 can be in an alternating arrangement, and each of the higher surface portions 142 and the lower surface portions 144 can be approximately flat or planar, so as to be approximately parallel to the first surface 112 when the flexible mat 110 is in the open condition. Although, alternative shapes for the higher surface portions 142 and the lower surface portions 144 of the at least one marking ridge 140a, 140b are contemplated. For example, in side view, the at least one marking ridge 140a, 140b can be approximately square waved, sine waved, triangle waved, and sawtooth waved. Further, in the depicted aspect, each of the marking ridges 140 includes the relatively higher offset surface portions 142 and relatively lower offset surface portions 144 and are similarly shaped.

Additionally, immediately adjacent marking ridges 140a, 140b of the plurality of marking ridges 140 can be of differing lengths and alternatingly arranged along the first end 116; although, this is not required. As shown, the marking ridges 140a are relatively longer marking ridges and the marking ridges 140b are relatively shorter marking. Each relatively longer marking ridge 140a among the plurality of relatively longer marking ridges 140a is disposed between two adjacent relatively shorter marking ridges 140b among the plurality of relatively shorter marking ridges 140b, except for one relatively longer marking ridge 140a among the plurality of relatively longer marking ridges 140a, which is located closest to the first side 120 of the mat 110, and another relatively longer marking ridge 140a among the plurality of relatively longer marking ridges 140a, which is located closest to the second side 122 of the mat 110. Similarly, each relatively shorter marking ridge 140b among the plurality of relatively shorter marking ridges 140b is disposed between two adjacent relatively longer marking ridges 140a among the plurality of relatively longer marking ridges 140a. However, it should be appreciated that the depicted alternating arrangement of the marking ridges 140a, 140 can be changed without departing from the present disclosure. For example, at least one relatively shorter marking ridge 140b among the plurality of relatively shorter marking ridges 140b can be located closest to at least one of the first and second sides 120, 122 of the mat 110, and the marking ridges 140a, 140b can be adjacent to like marking ridges 140a, 140b.

Further, each relatively longer marking ridge 140a among the plurality of relatively longer marking ridges 140a is spaced a distance "D" parallel to the rolling axis RA (FIG. 10) from an adjacent relatively longer marking ridge 140a among the plurality of relatively longer marking ridges 140a, and each relatively longer marking ridge 140a among the plurality of relatively longer marking ridges 140a is spaced a distance "d" parallel to the rolling axis RA from an adjacent relatively shorter marking ridge 140b among the plurality of relatively shorter marking ridges 140, wherein D=2d. This spacing between the marking ridges 140a, 140b allows a user to selectively slice relatively thicker sections and relatively thinner sections from the rolled food product 102 that are approximately equally sized.

Further, the flexible mat 110 can comprise a plurality of linear graduation markings 146 provided on the first surface 112 and forming a visual scale. One linear graduation marking 146a nearest the second side 122 of the mat 110 among the plurality of linear graduation markings 146 is aligned with a respective marking ridge 140 nearest the second side 122 among the plurality of marking ridges in a direction perpendicular to the rolling axis RA, and another linear graduation marking 146b nearest the first side 120 of the mat 110 among the plurality of linear graduation markings 146 is aligned with another respective marking ridge 140 nearest the first side 120 among the plurality of marking ridges in the direction perpendicular to the rolling axis RA. The linear graduation marking 146a can be a zero line linear graduation marking for the visual scale, and the linear graduation marking 146b can be a greatest line linear graduation marking for the visual scale. Therefore, the visual scale defined by the plurality of linear graduation markings 146 extended along the second end 118 allows for convenient measuring of a length of the rolled food product 102 relative to the plurality of marking ridges 140.

Figure 8:
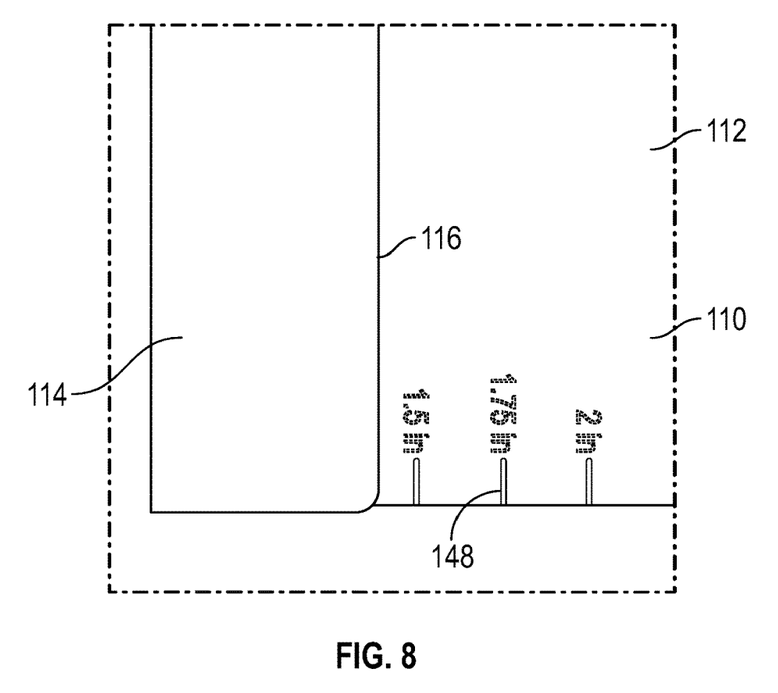

In addition, in FIG. 1, the mat 110 can have a diameter guide 148 for the rolled food product 102 that is provided on the first surface 112 along one of the first side 120 and the second side 122. As shown, the diameter guide 148 is defined by a plurality of diameter guide markings 148a approximately centrally located along the one side, each diameter guide marking 148a extending along the first surface 112 in a longest dimension parallel to the rolling axis RA. Indicia 148b provided on the first surface 112 is associated with each diameter guide marking 148a and corresponds to a distance that the respective diameter guide marking is offset from the first end 116 measured perpendicular to the rolling axis RA. And this distance from the first end 116 corresponds to a diameter of the rolled food product 102 when surrounded by the flexible mat 110 with the flexible mat rolled up around the rolled food product in the rolled condition with the first surface 112 in contact with the outer surface of the rolled food product (see FIG. 8). In the depicted aspect, the diameter guide 148 is provided on the first surface 112 along both sides 120, 122, wherein the plurality of diameter guide markings 148a includes a first set of diameter guide markings provided adjacent the first side 120 and a second set of diameter guide markings provided adjacent the second side 122.

Figure 9:
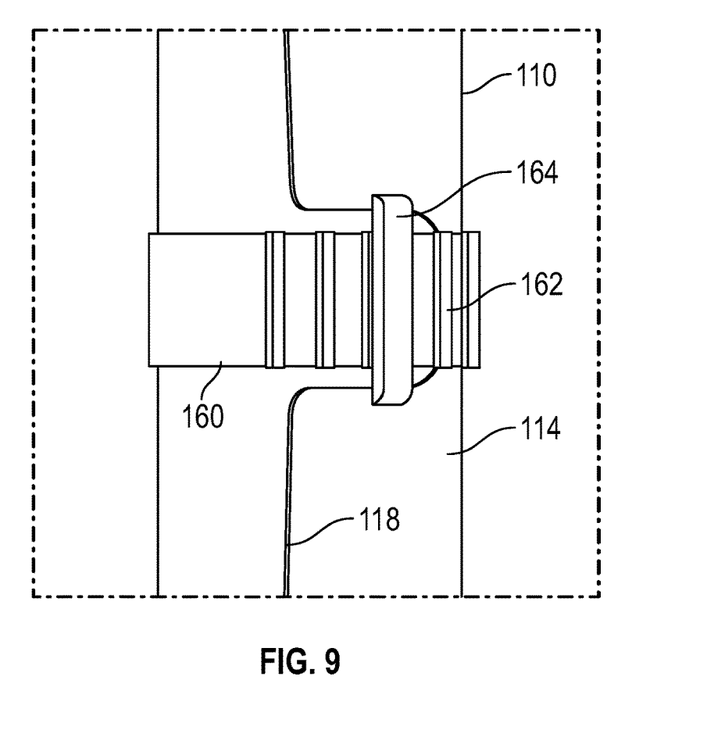

The flexible mat 110 additionally includes a fastening member 150 for securing the flexible mat in the rolled condition (see FIGS. 9 and 10). The fastener member 150 is re-closable, being configured to be repeatedly secured and released for repeatedly securing the mat 110 into and releasing mat from its rolled condition. As shown, the fastener member 150 is integral with the flexible mat to define a unitary, one-piece product. The fastener member 150 includes cooperating structures, including a structure 152 and a complementary structure 154, both of which are integral with mat 110 and formed of the same material as mat. In the depicted aspect, the fastening member 150 extends from the first end 116 or the second end 118 of the flexible mat, and the plurality of marking ridges 140 is provided along the other of the first end or the second end of the flexible mat. According to the present disclosure, the fastening member is a strap 160 with the structure 152 being spaced ridges 162 provided on a distal end portion of the strap and the structure 154 being a loop 164 provided on a proximal end portion of the strap. FIG. 9 shows the ridges 162 secured by the loop 164. With the depicted arrangement of the fastening member, the fastening member 150 is configured to be repeatedly interlocked and released to thereby repeatedly and releasably secure the mat in the rolled condition with differing sized rolled food products. It should be appreciated that when the fastening member 150 is released, i.e. when the ridges 162 are released from the loop 164, the mat 110 is unsecured and can, due to the inherently flexible and elastic material characteristics of the mat, automatically return to the open condition when placed down on a flat surface.

The apparatus 100 further includes at least one end cap 170 sized to be positioned in the first end opening 130 or second end opening 132 defined by the respective first side 120 and the second side 122 of mat 110 in the rolled condition. The at least one end cap 170 includes a central section 172 and a flexible edge portion 174 surrounding the central section. A substantially circular flange 176 depends from the central section 172, the flange providing rigidity to the at least one end cap 170. The flexible edge portion 174 can be made of the same or similar material as the flexible mat 110 to allow for deformation of the at least one end cap when positioned in the first end opening 130 or second end opening 132. It should be appreciated that the deformation of the edge portion 174 allows use of the at least one cap with differing volumes of the mat in the rolled condition, again predicated on the size of the rolled food product 102 to be wrapped within the mat. To further allow for deformation, the flexible edge portion 174 includes at least two cutouts 180 to separate the flexible edge portion into at least two flexible sections 182, 184. In the depicted aspect, four cutouts 180 are provided separating the edge portion into four flexible sections 182, 184, 186, 188, wherein the cutouts are approximately equally spaced thereby defining approximately equally sixed flexible sections. Further, the at least one end cap is a first end cap 170 and the apparatus 100 includes a second end cap 190 to be positioned in the other of the first end opening 130 and the second end opening 132. The second end cap is constructed identical to the first end cap.

FIG. 10 illustrates the first and second end caps 170, 190 positioned/being positioned in the respective first and second end openings 130, 132 to thereby enclose the volume V and the rolled food product 102 placed therein and thereby forming a closed container assembly. Each of the first and second end caps can be repeatedly positioned in and removed from the first and second end openings as needed. The first and second end caps 170, 190 are identical and interchangeable in the illustrative embodiment disclosed herein, and can be used independently from one another. The container assembly formed by the assembly of mat 110 in the rolled condition and the first and second end caps 170, 190 is useful for storage of the rolled food product 102.

Figure 7:
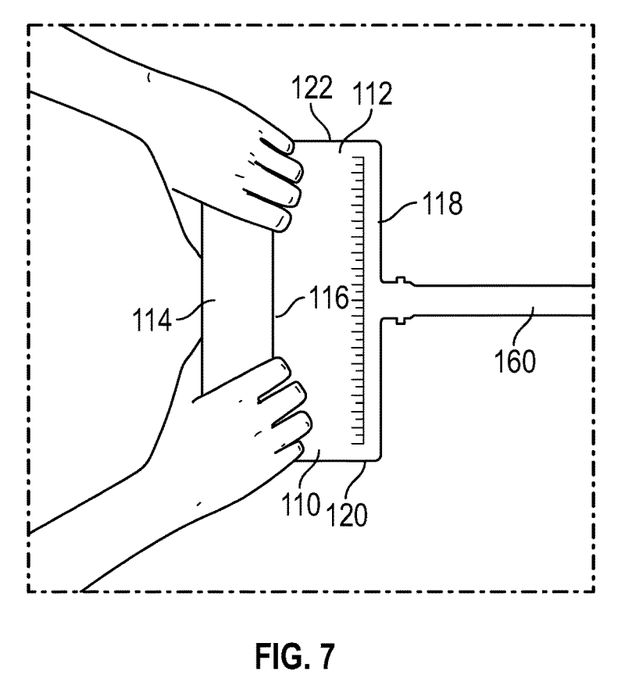

FIGS. 6-11 depict an exemplary method of using the apparatus 100. In FIG. 6, the rolled food product 102 is placed on the first surface 112 of the mat adjacent the plurality of marking ridges 140 extending along the first end 116. It should be appreciated that the food product can be pre-rolled prior to placement on the mat 110 or prepared and rolled on the mat. In FIG. 7, the first end 116 of the mat 110 is rolled over the rolled food product 102 such that the first end 116 is immediately adjacent to or contacts the first surface 112. With the first end rolled over the rolled food product, the diameter guide 148 if provided on the mat 110 can indicate a size of the rolled food product (see FIG. 8 with the first end 116 approaching the diameter guide 148). In FIG. 9, the mat is rolled into the rolled condition and the ridges 162 provided on the strap 160 are secured by the loop 164. Again, in the rolled condition, the second surface 114 defines the exterior surface of the mat 110. In FIG. 10, and as indicated above, the first and second end caps 170, 190 are positioned/being positioned in the respective first and second end openings 130, 132 to thereby enclose the volume V and the rolled food product 102 placed therein and thereby forming the closed container assembly. The closed container assembly can then be placed in a refrigerator or freezer for later use. FIG. 11 depicts the mat returned back to the open condition, with the plurality of marking ridges 140 having formed a cutting guide with slice locations on the rolled food product 102.

Accordingly, a method for aiding in locating slice locations on a rolled food product 102 is provided. The exemplary method comprises placing a flexible mat 110 in an open condition with a first surface 112 facing up, the flexible mat 110 including a plurality of marking ridges 140 extending from the first surface, each marking ridge 140 among the plurality of marking ridges extending along the first surface 112 with a longest dimension perpendicular to a rolling axis RA for the flexible mat and spaced from an adjacent marking ridge among the plurality of marking ridges in a direction parallel to the rolling axis; positioning the rolled food product 102 on the first surface 112 and adjacent the plurality of marking ridges 140, the rolled food product 102 extending in a longest dimension parallel to the rolling axis RA; and rolling the flexible mat 110 together with the rolled food product 102 about the rolling axis toward a rolled condition forming indentations on an outer surface of the rolled food product 102, where the indentations define slice locations.

The exemplary method further includes positioning at least one end cap 170, 190 in a first end opening 130 or a second end opening 132 formed by the flexible mat when in the rolled condition. The exemplary method further includes securing the flexible mat 110 in the rolled condition. The exemplary method further includes wrapping the flexible mat 110 in the rolled condition with a fastening member 150 for securing the flexible mat 110 in the rolled condition.

In FIG. 1, the spacing between the marking ridges 140a, 140b of the plurality of marking ridges 140, the linear graduation markings 146 defining the visual scale, and the indicia 148b of the diameter guide 148 are depicted with the English system of measurement (i.e., inches). However, it should be appreciated that the metric system of measurement can alternatively be used.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus for aiding in locating slice locations on a rolled food product, the apparatus comprising:
   a flexible mat including a first side and a second side each extending between a first end and a second end, and a first surface and a second surface opposite to the first surface, the flexible mat having an open condition where the flexible mat is substantially flat and the flexible mat is configured to be rolled up about a rolling axis toward a rolled condition with the first surface facing toward the rolling axis; and
   a plurality of marking ridges extending from the first surface, each marking ridge among the plurality of marking ridges extending along the first surface with a longest dimension perpendicular to the rolling axis and spaced from an adjacent marking ridge among the plurality of marking ridges in a direction parallel to the rolling axis, the plurality of marking ridges being configured to form indentations on an outer surface of an associated rolled food product when the flexible mat is pressed against the associated rolled food product or vice versa, the indentations defining the slice locations,
   where in the rolled condition the first surface of the flexible mat defines a volume predicated on a size of the associated rolled food product to be received therein with the first surface surrounding the associated rolled food product, wherein the first side and the second side encircle opposed first and second end openings to the volume, and the apparatus further including at least one end cap sized to be positioned in the first end opening or the second end opening,
   wherein the at least one end cap includes a flexible edge portion allowing for deformation of the at least one end cap when positioned in the first end opening or the second end opening.

2. The apparatus of claim 1, wherein each marking ridge among the plurality of marking ridges being and terminates nearer to the first end as compared to the second end.

3. The apparatus of claim 1, wherein at least one marking ridge among the plurality of marking ridges includes an upper surface including relatively higher offset surface portions and relatively lower offset surface portions that are situated closer to the first surface in a direction normal to the first surface as compared to the relatively higher offset surface portions.

4. The apparatus of claim 1, wherein the plurality of marking ridges includes a plurality of relatively shorter marking ridges and a plurality of relatively longer marking ridges.

5. The apparatus of claim 4, wherein each relatively shorter marking ridge among the plurality of relatively shorter marking ridges is disposed between two adjacent relatively longer marking ridges among the plurality of relatively longer marking ridges,
   wherein each relatively longer marking ridge among the plurality of relatively longer marking ridges is disposed between two adjacent relatively shorter marking ridges among the plurality of relatively shorter marking ridges, except for one relatively longer marking ridge among the plurality of relatively longer marking ridges, which is located closest to the first side, and another relatively longer marking ridge among the plurality of relatively longer marking ridges, which is located closest to the second side.

6. The apparatus of claim 4, wherein each relatively longer marking ridge among the plurality of relatively longer marking ridges is spaced a distance D parallel to the rolling axis from an adjacent relatively longer marking ridge among the plurality of relatively longer marking ridges, and each relatively longer marking ridge among the plurality of relatively longer marking ridges is spaced a distance d parallel to the rolling axis from an adjacent relatively shorter marking ridge among the plurality of relatively shorter marking ridges, wherein $D=2d$.

7. The apparatus of claim 1, further comprising a plurality of linear graduation markings provided on the first surface and forming a visual scale, wherein one linear graduation marking nearest the first side among the plurality of linear graduation markings being aligned with a respective marking ridge nearest the first side among the plurality of marking ridges in a direction perpendicular to the rolling axis, and another linear graduation marking nearest the second side among the plurality of linear graduation markings being aligned with another respective marking ridge nearest the second side among the plurality of marking ridges in a direction perpendicular to the rolling axis.

8. The apparatus of claim 7, wherein the one linear graduation marking nearest the first side among the plurality of linear graduation markings is a greatest line linear graduation marking for the visual scale, and the another linear graduation marking nearest the second side among the plurality of linear graduation markings is a zero line linear graduation marking for the visual scale.

9. The apparatus of claim 1, wherein the flexible edge portion includes at least two cutouts to separate the flexible edge portion into at least two flexible sections.

10. The apparatus of claim 1, further including a fastening member for securing the flexible mat in the rolled condition.

11. The apparatus of claim 10, wherein the fastening member extends from the second end of the flexible mat, and the plurality of marking ridges is provided nearer to the first end as compared to the second end of the flexible mat.

12. The apparatus of claim 10, wherein the fastening member is a strap that is integral with the flexible mat to define a unitary, one-piece product.

13. An apparatus for aiding in locating slice locations on a rolled food product, the apparatus comprising:
    a flexible mat including a first side and a second side each extending between a first end and a second end, and a first surface and a second surface opposite to the first surface, the flexible mat having an open condition where the flexible mat is substantially flat and the flexible mat is configured to be rolled up about a rolling axis toward a rolled condition with the first surface facing toward the rolling axis;
    a plurality of marking ridges extending from the first surface, each marking ridge among the plurality of marking ridges extending along the first surface with a longest dimension perpendicular to the rolling axis and spaced from an adjacent marking ridge among the plurality of marking ridges in a direction parallel to the rolling axis, the plurality of marking ridges being configured to form indentations on an outer surface of an associated rolled food product when the flexible mat is pressed against the associated rolled food product or vice versa, the indentations defining the slice locations; and a plurality of diameter guide markings provided on the first surface, each diameter guide marking among the plurality of diameter guide markings extending along the first surface in a longest dimension parallel to the rolling axis; and indicia provided on the first surface associated with each diameter guide marking among the plurality of diameter guide markings, wherein the respective indicia for each respective diameter guide marking corresponds to a distance that the respective diameter guide marking is offset from the first end measured perpendicular to the rolling axis, which distance corresponds to a diameter of the associated rolled food product when surrounded by the flexible mat with the flexible mat rolled up around the associated rolled food product in the rolled condition with the first surface in contact with the outer surface of the associated rolled food product.

14. The apparatus of claim 13, wherein the plurality of diameter guide markings provided on the first surface includes a first set of diameter guide markings provided adjacent the first side and a second set of diameter guide markings provided adjacent the second side.

15. An apparatus for aiding in locating slice locations on a rolled food product, the apparatus comprising:

a flexible mat including a first side and a second side each extending between a first end and a second end, and a first surface and a second surface opposite to the first surface, the flexible mat having an open condition where the flexible mat is substantially flat and the flexible mat is configured to be rolled up about a rolling axis toward a rolled condition with the first surface facing toward the rolling axis; and a plurality of marking ridges extending from the first surface, each marking ridge among the plurality of marking ridges extending along the first surface with a longest dimension perpendicular to the rolling axis and spaced from an adjacent marking ridge among the plurality of marking ridges in a direction parallel to the rolling axis, the plurality of marking ridges being configured to form indentations on an outer surface of an associated rolled food product when the flexible mat is pressed against the associated rolled food product or vice versa, the indentations defining the slice locations, wherein at least one marking ridge among the plurality of marking ridges includes an upper surface including relatively higher offset surface portions and relatively lower offset surface portions that are situated closer to the first surface in a direction normal to the first surface as compared to the relatively higher offset surface portions.

16. The apparatus of claim 15, wherein the higher surface portions and the lower surface portions are in an alternating arrangement.

17. An apparatus for aiding in locating slice locations on a rolled food product, the apparatus comprising:

a flexible mat including a first side and a second side each extending between a first end and a second end, and a first surface and a second surface opposite to the first surface, the flexible mat having an open condition where the flexible mat is substantially flat and the flexible mat is configured to be rolled up about a rolling axis toward a rolled condition with the first surface facing toward the rolling axis;

a plurality of marking ridges extending from the first surface, each marking ridge among the plurality of marking ridges extending along the first surface with a longest dimension perpendicular to the rolling axis and spaced from an adjacent marking ridge among the plurality of marking ridges in a direction parallel to the rolling axis, the plurality of marking ridges being configured to form indentations on an outer surface of an associated rolled food product when the flexible mat is pressed against the associated rolled food product or vice versa, the indentations defining the slice locations; and a fastening member for securing the flexible mat in the rolled condition, the fastening member configured to be wrapped about the rolling axis along the second surface.

18. The apparatus of claim 17, wherein the fastening member extends from the second end of the flexible mat in a direction parallel to the first and second sides.

19. The apparatus of claim 17, wherein the fastening member is a strap that is integral with the flexible mat to define a unitary, one-piece product.

\* \* \* \* \*